C. G. SIMONDS & G. W. DOERR.
CORNER FASTENER.
APPLICATION FILED JUNE 15, 1916.

1,215,882.

Patented Feb. 13, 1917.

INVENTORS,
Charles G. Simonds
George W. Doerr

BY Morsell, Keeney & French
ATTORNEYS.

UNITED STATES PATENT OFFICE.

CHARLES G. SIMONDS, OF MILWAUKEE, WISCONSIN, AND GEORGE W. DOERR, OF CHICAGO, ILLINOIS.

CORNER-FASTENER.

1,215,882.  Specification of Letters Patent.  Patented Feb. 13, 1917.

Application filed June 15, 1916. Serial No. 103,705.

*To all whom it may concern:*

Be it known that we, CHARLES G. SIMONDS and GEORGE W. DOERR, citizens of the United States, and residents of, respectively, Milwaukee, in the county of Milwaukee and State of Wisconsin, and Chicago, in the county of Cook and State of Illinois, have invented new and useful Improvements in Corner-Fasteners, of which the following is a description, reference being had to the accompanying drawings, which are a part of this specification.

The invention relates to corner fasteners and more particularly to fasteners for securing together the glass plates forming show cases, said plates being secured by the present device without the necessity of making notches or holes in the plates.

While the invention is well adapted for glass receptacles it may also be used for holding plates of wood, steel or any material for securing the plates to form boxes, bins and shelves for the display of merchandise and is very useful where frequent changes in the form of the receptacles is desired. With the present device the plates can be quickly and easily assembled together, taken apart and reassembled in the same or in a different form as often as desired and without weakening the plates by the drilling of holes.

The invention is further designed to provide what may be termed a universal fastener in that it may be used at all four corners of a receptacle to secure vertically disposed plates running at an angle to each other together or at all four corners to secure a horizontally extending plate to a vertically disposed plate and it is further designed to secure one plate at an angle to another plate where one of said plates extends beyond the other.

The invention further consists in the several features hereinafter set forth and is more particularly defined by claims at the conclusion hereof.

The device comprises a pair of corner clamps and means for securing said clamps together.

Figure 3:
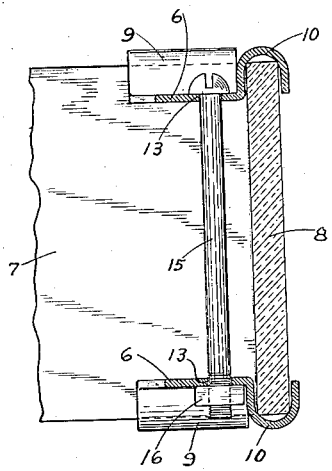
Fig. 3 is a section on the line 3—3 of Fig. 2.
Figure 4:
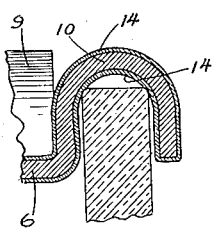
Fig. 4 is a detail vertical sectional view through one of the clamps, showing it provided with a coating of tin.

Each clamp comprises a flat body portion 6 preferably forming a right triangle to form a right angle joint between adjoining plates 7 and 8 and integral hook portions 9 and 10 preferably curved which extend from the sides forming the right angle and having their inner edges 11 and 12 coincident with the adjacent side of said angle. These hook portions 9 and 10 are adapted to engage over the edges of the plates 7 and 8 respectively and are made curved so as to permit said clamps to be used with plates of various thicknesses as the curved formation of the hook always insures its engagement with the straight edges of the plates of varying thicknesses, as will be apparent from Fig. 4. The body portion 6 is provided with an aperture 13 and the hook portions are offset from said body portion, as shown in Fig. 3 to dispose the body portion below or within edges of the plates so that the clamping means hereinafter described will come below the edges of the plates which is of decided advantage in that the fastening means will not form objectionable projections on the case or receptacle. These clamps are preferably made from sheet metal, preferably cold rolled steel, pressed to shape and are preferably coated with a coating 14 of soft tin so as to insure a firm engagement with the edges of the glass plates.

The means for securing the clamps together comprises a bolt 15 which passes through the apertures 13 in the body portion 6 of the clamps and is provided with a nut 16. The clamps are oppositely disposed with respect to each other so that their hook portions will engage opposite edges of the plates adjacent the joint and by tightening up on the bolt said clamps are moved toward each other causing the hook portions to grip the opposite edges of the plates and thus firmly secure them in position and against movement with respect to each other. To dissemble the plates it is only necessary to loosen the bolt 15 and slip the clamps from the plates.

Figure 1:
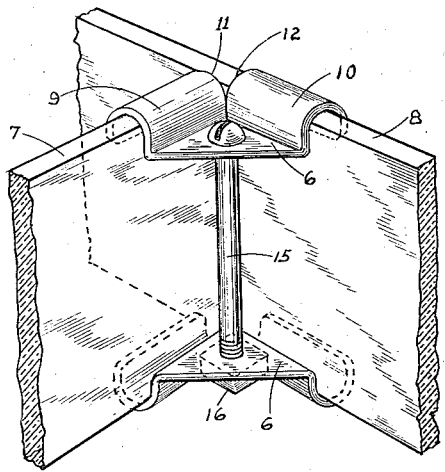
Figure 1 is a perspective view of the device applied to two angularly disposed plates to form a joint between them, one of said plates extending beyond the other plate.
Figure 2:
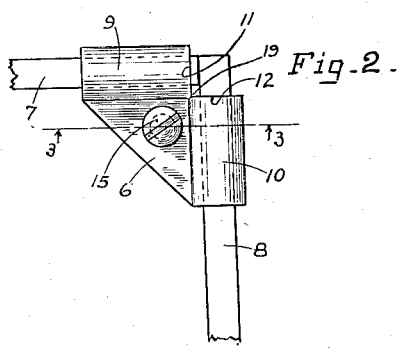
Fig. 2 is a plan view of the device shown in Fig. 1.
Figure 5:
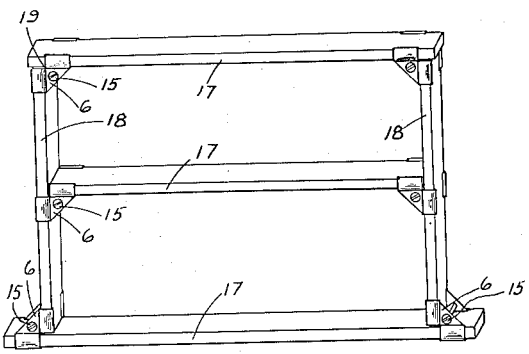
Fig. 5 is a perspective view of the device showing it applied to a show case.

In Fig. 1 we have shown the device applied to vertically disposed plates 7 and 8 disposed at an angle with respect to each other, the plate 8 extending beyond the plate 7. If desired the plates could be so arranged as to meet as shown in Fig. 2. In these figures the clamps are horizontally disposed to secure vertically disposed plates but by tipping said clamps to the vertical, as shown in Fig. 5, we can join horizontally extending plates or shelves 17 to vertical plates 18 and the device may be used on any corner of the receptacle.

The universal application of this device as just described is due to the fact that the hook portions extend only along the side of the body portion with which they are integrally connected so that an open corner notch 19 results and this notch is disposed at the joint of the plates. Should one of the hook portions be extended beyond the side of the body so as to project into the space at the joint of the plates then the clamps could not be used at all four corners to secure a horizontal shelf to the upper edge of a pair of vertically disposed plates.

It will be further noted that the body portion 6 together with the sides of the hook portions 9 and 10 which extend from said body portion to the edges of the plates which they join form a brace for said plates in addition to clamping them in position.

While we have shown a bolt passing through apertures in each of the clamps for securing the clamps to the plates and which construction is our preferred form, we are aware that various other fastening means between the clamps may be employed for drawing the clamps together and any modifications which come within the scope of the appended claims we deem to be within the spirit of our invention.

What we claim as our invention is:

1. A corner fastening device for holding plates extending at angles to each other comprising a clamp for engaging the plates near their point of joinder, and means for detachably securing said clamp to the plates, said clamp comprising a body portion and plate engaging portions integral with said body portion, said plate engaging portions extending outwardly on opposite sides of the body portion to form an opening for the intersection of the plate.

2. A corner fastening device for holding plates extending at angles to each other comprising a clamp and means for securing said clamp to the edges of the plates at the point of joinder, said clamp comprising hook portions for engaging the edges of the plates and a body portion offset from said hook portions and integral with the same, said hook portions being formed on opposite sides of said body portion to form an opening for the intersection of the plate.

In testimony whereof, we affix our signatures.

CHARLES G. SIMONDS.
GEORGE W. DOERR.